United States Patent Office 2,708,027
Patented May 10, 1955

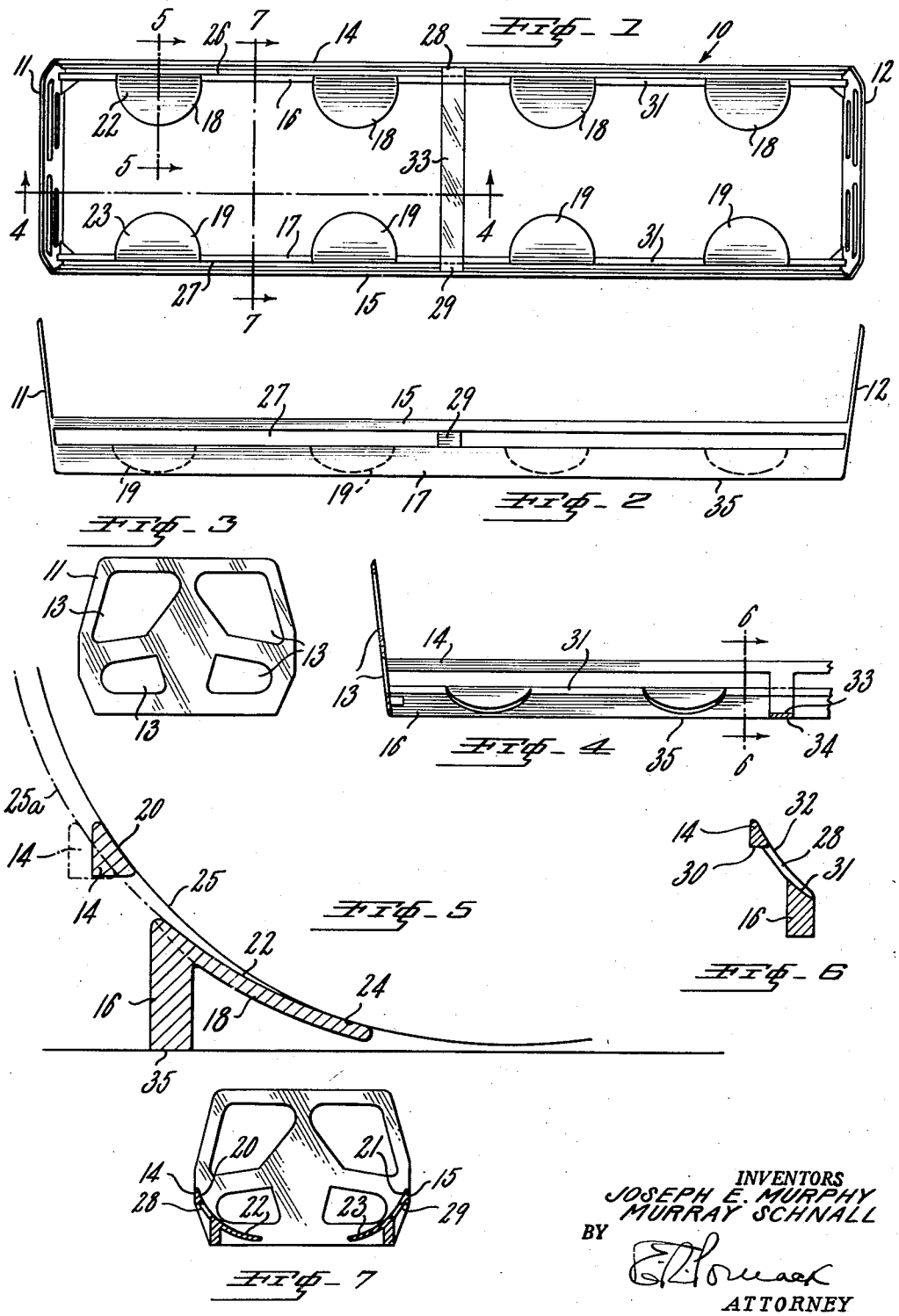

2,708,027

CONTAINER TRAYS FOR FRUIT UNITS

Joseph E. Murphy, Hicksville, and Murray Schnall, Brooklyn, N. Y., assignors to See-Qual Package Corp., New York, N. Y., a corporation of New York Application August 7, 1952, Serial No. 303,063

4 Claims. (Cl. 206—45.33)

This invention relates to container trays for housing a row of fruit units, such as the trays described in our prior patent applications identified by Serial Nos. 284,363 and 289,506, filed respectively on April 25, 1952 and May 23, 1952, and the latter filed application now Patent No. 2,680,513, granted June 8, 1954.

It is primarily within our contemplation to provide a tray for use as a wrapped package to contain soft fruit units, such as tomatoes, and which necessarily vary in size. When such units are packed within the conventional flexible cardboard box, they are readily subject to injury; and even when they are packed in more rigid containers, like the preferably plastic trays of our said prior patent applications, there is also some possibility that the fruit may be bruised. For example, in the tray structure of our last-filed patent application, Serial No. 289,506, there are two comparatively rigidly supported upper rail members against which the fruit units are in resting engagement. If the fruits are tomatoes of slightly varying sizes, the opposite rails might cause an indenture or ridge in a larger tomato disposed under pressure therebetween. If is accordingly an object of our invention to obviate the danger of such bruising, particularly by lateral supporting rails, through the provisions of yieldable means that provide adequate lateral support and which are laterally movable when subjected to outward pressure, like the pressure caused by a large tomato pressed between the opposite portions of the said two upper rail members of the tray of our aforementioned prior invention.

And in the last-mentioned aspect of our invention, it is a further object to provide an arrangement of seating pads which are adapted to supportably receive the undersides of a row of fruit units disposed within the tray, without injury to the fruits when supported laterally by yieldable upper rail members in both their normal and yieldably distorted positions.

Other objects, features and advantages will appear from the drawings and the description hereinafter given.

Referring to the drawings,

Figure 1 is a plan view showing one form of tray according to our invention.

Figure 2 is a side elevational view of Figure 1.

Figure 3 is an end view of Figure 1.

Figure 4 is a fragmentary section of Figure 1 taken along line 4—4.

Figure 5 is an enlarged section of Figure 1 taken along line 5—5, showing the outline of a portion of a tomato being yieldably supported by the upper rail and the pad therebelow, the dot-dash lines indicating a displaced position of the upper rail member and a tomato thereagainst.

Figure 6 is a section of Figure 4 taken along line 6—6, and

Figure 7 is a section of Figure 1 taken along line 7—7.

The container tray 10 is adapted to contain a row of four tomatoes, the tray and the fruit units therein being adapted to be wrapped in a sheet of transparent material, substantially in the manner referred to in our said prior applications. The tray contains the opposite end walls 11 and 12 with apertured portions generally designated 13, two parallel upper rails 14 and 15 disposed between and connected to said end walls and positioned on opposite lateral sides of the tray, base rails 16 and 17 disposed below and laterally inwardly of said upper rails 14 and 15 and also connected to said end walls 11 and 12, said base rails 16 and 17 supporting two rows of seating pads 18 and 19, respectively.

As will be noted from Figures 5 and 7, the upper rails are generally triangular in cross-section, the opposite upper surfaces 20 and 21 being preferably slightly concavely arcuate, and facing inwardly and upwardly, as illustrated. Each of the pad members 18 and 19 is also of curved configuration, cross-sections thereof presenting upper concave surfaces 22 and 23 facing the interior of the tray. When the said rails 14 and 15 are in their normal undistorted positions, such as that represented by the full line position of rail 14 in Figure 5, the lower innermost portion of each of the upper surfaces of the pads is in the path of an arc extending substantially along the upper surface of the adjacent upper rail, so that substantially spherical units on the pads will be engaged and supported by the upper concave surfaces of adjacent coacting upper rail and pad members. For example, by referring to Figure 5, it will be seen that innermost portion 24 of upper surface 22 of pad 18 is in the path of the arc 25 which extends along said surface 20 of upper rail 14. The arrangement is hence such that if arc 25 represents the outline of a portion of a tomato disposed within the tray, said portion will be supported both by the rail member 14 and the pad 18.

As aforesaid, the pads 18 and 19 are supported by the base rails 16 and 17, respectively. When the entire device is molded from plastic, the pads are integral with their respective base rails, as clearly illustrated in Figure 5. It has been found that the pads are in this manner adequately supported by said base rails, particularly in view of the fact that the pads have slight flexibility downwardly. This structure is to be distinguished from that shown in our prior application, Serial No. 289,506, in which the pads are supported by members corresponding to upper rails 14 and 15 and base rails 16 and 17. In the structure of our said prior application, the upper rails corresponding to rails 14 and 15 of this application are held against outward movement, thereby presenting a situation in which a soft fruit unit such as a tomato might be damaged by its contact with the substantially rigid or immovable upper rail members. In the present invention, however, the pad members 18 and 19 are not connected to the upper rails 14 and 15, the upper and the lower base rails being separated from each other by spaces 26 and 27 along the entire length of the device, except at the region of the medial bars or struts 28 and 29 which connect the upper and base rails at the opposite sides of the tray. The arrangement is hence such that while the said struts 28 and 29 serve to restrict the outward movement of the medial portions of upper rails 14 and 15, they do not prevent a slight outward flexing of said upper rails at other portions thereof. It is therefore apparent that if a tomato were to be squeezed between opposite portions of upper rails 14 and 15, such rails would flex outwardly, as indicated in Figure 5 by the dot-dash position of upper rail 14 when a tomato 25a is pressed thereagainst. Due to such flexibility, the tray is adapted to accommodate a plurality of tomatoes some of which may be sufficiently large to cause such outward flexing of the upper rails, without damage to such tomatoes because of said outward flexing action. It will be further noted that when the upper rails are in an outwardly displaced position, such as that of rail 14 in its dot-dash position of Figure 5, the tomato 25a is in contacting engagement with substantially the entire upper surface of the underlying pad member, such as with surface 22 of pad 18.

The struts 28 and 29 extend downwardly and inwardly from the lower surface 30 of each said upper rails (see Figure 6), said struts extending over the upper bevelled surface 31 of each of said base rails. It is preferred that the upper surface 32 of each of said struts be concavely curved inwardly, so as to provide a seat for any tomato that may extend downwardly to the level of the struts.

In the form of our invention illustrated, there is a transverse medial bar 33 which connects the laterally opposite base rails 16 and 17, the lowermost surface 34 of said base bar being at the level of the lowermost surface 35 of the base rails, thereby presenting a flush base surface at the bottom of the tray, an arrangement which is required for stability, rigidity as well as for effective use with automatic wrapping apparatus.

It is thus apparent that the invention above described is capable of attaining the main objectives set forth in our said previous applications, along with the further important objective of providing a sufficiently yieldable and resilient support for soft fruit units contained within the tray to reduce or eliminate the danger of damage thereto.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

We claim:

1. In a moulded container tray of the type adapted to constitute part of a wrapped housing for a row of fruit units, two opposite end walls, a pair of laterally opposite longitudinally extending upper rails disposed between and yieldably connected to said end walls, a pair of laterally opposite longitudinally extending lower rails disposed between and connected to said end walls, two parallel rows of spaced fruit seating pads integral with said lower rails and extending toward each other, the pads of said rows being arranged in opposed pairs and having substantially concavely curved supporting surfaces facing the interior of said tray for individually receiving fruit units, said upper rails being spaced outwardly relative to said lower rails and having supporting walls facing inwardly and providing a common lateral support for the fruit units, said concavely curved supporting surfaces and the adjacent sections of said supporting walls cooperating to yieldably cradle the individual fruit units.

2. In a moulded container tray of the type adapted to constitute part of a wrapped housing for a row of fruit units, two opposite end walls, a pair of laterally opposite longitudinally extending upper rails disposed between and yieldably connected to said end walls, said upper rails each being generally triangular in cross-section and having one longitudinal wall thereof facing the interior of the tray, a pair of laterally opposite longitudinally extending lower rails connected to said end walls and disposed below and laterally inwardly of said upper rails, and two parallel rows of separate and independent fruit seating pads integral with said lower rails and extending toward each other, said pads extending inwardly within the tray and having substantially concavely curved surfaces facing the interior of said tray, said longitudinal walls of said rails and said concavely curved surfaces of said pads defining cradles individual to the respective fruit units.

3. In a container tray of the type adapted to constitute part of a wrapped housing for a row of fruit units, two opposite end walls, a pair of laterally opposite longitudinally extending upper rails disposed between and connected to said end walls, said upper rails each being generally triangular in cross-section and having one longitudinal wall thereof concavely curved transversely of its length and facing the interior of the tray in an upwardly inclined slope, a pair of laterally opposite longitudinally extending lower rails connected to said end walls and disposed below and laterally inwardly of said upper rails, two parallel rows of spaced independent fruit seating pads secured to said lower rails and extending toward each other, said pads extending inwardly within the tray and having a curved surface facing the interior of said tray and cooperating with the one longitudinal wall of said upper rail to define cradles individual to the respective fruit units, and laterally opposite strut members connecting said upper and lower rails at substantially their medial portions, said upper rails being flexible, whereby the sections thereof flanking said medial portions will yield under pressure applied in a direction transverse to the longitudinal extent of the tray, the upper surfaces of said strut members being concavely curved in a direction transverse to the longitudinal extent of the tray.

4. In a moulded container tray of the type adapted to constitute part of a wrapped housing for a row of fruit units, two opposite end walls, a pair of laterally opposite longitudinally extending upper rails disposed between and connected to said end walls, said upper rails each having an inclined wall facing the interior of the tray, a pair of laterally opposite longitudinally extending base rails disposed between and connected to said end walls below and laterally inwardly of said upper rails, the lowermost portions of said base rails being substantially at the level of the lowermost portions of said end walls, said base rails having bevelled upper surfaces inclined inwardly and downwardly, and two inwardly extending parallel rows of spaced independent fruit seats fixed to said base rails and having curved surfaces merging with said bevelled surfaces of said base rails and extending toward each other, the inclined walls of said upper rails and the curved surfaces of said fruit seats being arranged to provide continuous cradle-like supports for the individual fruit units.

References Cited in the file of this patent

UNITED STATES PATENTS

| | | |
|---|---|---|
| Re. 17,279 | Copeman | Apr. 23, 1929 |
| 1,351,740 | Boyd | Sept. 7, 1920 |
| 2,089,728 | Brogden | Aug. 10, 1937 |
| 2,119,773 | Buckner | June 7, 1938 |
| 2,368,797 | Bailar | Feb. 6, 1945 |
| 2,470,456 | Bailar et al. | May 17, 1949 |